United States Patent [19]
Joong et al.

[11] Patent Number: 6,163,704
[45] Date of Patent: *Dec. 19, 2000

[54] DELIVERY OF SUBSCRIBER DIGITAL DATA MESSAGES IN A DUAL MODE CELLULAR TELEPHONE NETWORK

[75] Inventors: Donald Joong; Nikos Katinakis, both of Montreal; Akbar Rahman, Brossard, all of Canada

[73] Assignee: Telefonaktiebolaget LM Ericsson (publ), Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 08/749,807

[22] Filed: Nov. 15, 1996

[51] Int. Cl.[7] ...................................................... H04Q 7/22
[52] U.S. Cl. ........................................... 455/466; 455/553
[58] Field of Search ..................................... 455/466, 455, 455/433, 516, 552, 553

[56] References Cited

U.S. PATENT DOCUMENTS

| | | | |
|---|---|---|---|
| 4,677,609 | 6/1987 | Piereth et al. | 370/60 |
| 4,914,651 | 4/1990 | Lusignan | 455/466 |
| 5,046,183 | 9/1991 | Dorst et al. | 370/110 |
| 5,181,237 | 1/1993 | Dowden et al. | 379/88 |
| 5,321,737 | 6/1994 | Patsiokas | 379/58 |
| 5,351,235 | 9/1994 | Lahtinen | 370/58 |
| 5,396,539 | 3/1995 | Slekys et al. | |
| 5,404,355 | 4/1995 | Raith . | |
| 5,420,911 | 5/1995 | Dahlin et al. | |
| 5,511,111 | 4/1996 | Serbetcioglu et al. | |
| 5,528,664 | 6/1996 | Slekys et al. | 455/466 |
| 5,546,444 | 8/1996 | Roach, Jr. et al. | 455/466 |
| 5,570,467 | 10/1996 | Sawyer | 455/515 |
| 5,574,750 | 11/1996 | Peponides et al. | 455/132 |
| 5,737,706 | 4/1998 | Seazholtz et al. | 455/466 |

FOREIGN PATENT DOCUMENTS

| | | |
|---|---|---|
| 0 571 104 | 5/1993 | European Pat. Off. . |
| 0 689 368 | 6/1994 | European Pat. Off. . |
| 0 661 893 | 12/1994 | European Pat. Off. . |
| 43 40 679 | 6/1995 | Germany . |
| WO 95/07595 | 3/1995 | WIPO . |
| WO 95/14359 | 5/1995 | WIPO . |

OTHER PUBLICATIONS

PCT Search Report, dated Jul. 31, 1998 for PCT/SE 97/01892.

*Primary Examiner*—Edward F. Urban
*Attorney, Agent, or Firm*—Jenkens & Gilchrist

[57] ABSTRACT

A number of different mechanisms are proposed for effectuating the delivery of digital data messages to mobile stations which have currently selected an analog control channel. In one method, a signal is sent to the mobile station instructing it to make a server reselection and choose the best available digital control channel. Once the reselection is accomplished, the digital data message is delivered in a conventional manner using the digital control channel. In another method, the digital data message is reformatted for analog delivery, and the reformatted message sent over either the analog control channel or a selected analog voice channel. In yet another method, a call connection is made with the mobile station over a voice channel, and a synthesized audible message corresponding to the digital data message is transmitted over the voice channel after the subscriber answers the call. In instances where message delivery over the control channel is interrupted due to mobile station roaming, a forced re-registration occurs following the new server reselection, thus triggering continued message delivery over the new control channel.

19 Claims, 4 Drawing Sheets

DELIVERY OF SUBSCRIBER DIGITAL DATA MESSAGES IN A DUAL MODE CELLULAR TELEPHONE NETWORK

BACKGROUND OF THE INVENTION

1. Technical Field of the Invention

The present invention relates to cellular telephone networks and, in particular, to the delivery of digital data messages in a dual (analog/digital) mode cellular telephone environment. The invention addresses both the scenario where the cellular telephone is analog, digital, or dual mode, as well as the scenario where the cellular telephone network infrastructure supports analog, digital or dual mode operation.

2. Description of Related Art

Reference is now made to FIG. 1 wherein there is shown a block diagram of a conventional cellular telephone network 10. Many such networks 10 support a short message service (SMS) for use by subscribers in conjunction with the conventional cellular telephone service. The purpose of the short message service is to provide a means for transferring textual messages between short message entities (SMEs) 12 using the communications environment provided by the cellular telephone network 10.

The short message entities 12 participating in the short message service comprise short message terminals (SMT) 14 connected to the cellular network 10 or to the fixed telephone network 16 (comprising a public switched telephone network (PSTN) or other equivalent telephone network). The short message entities 12 further comprise the subscriber mobile stations (MS) 18 operating within the cellular telephone network 10. Short message service messages must originate with or terminate at one of the subscriber mobile stations 18.

A short message service center or message center (MC) 20 is connected to the fixed telephone network 16 and to the cellular telephone network 10. The message center 20 functions as a store and forward center for receiving and delivering short message service messages between the short message entities 12. In those instances where delivery of a short message service message to a short message service entity 12 fails, the message is stored in the message center 20, to be subsequently delivered by the message center to the addressee short message entity at a later time.

The cellular telephone network 10 further includes a plurality of base stations 24 (only one shown) for effectuating radio frequency communications over an air interface 26 with the mobile stations 18. Each base station 24 is connected to a mobile switching center (MSC) 30, with at least one mobile switching center connected to the fixed telephone network 16. The mobile switching center 30 operates to control base station 24 operation, maintain a record (in a home location register 42 as well as its visitor location register 44) of mobile station 18 operating parameters and location within the network 10 and switch, with the fixed telephone network 16, those cellular telephone calls originated by or terminated at the mobile stations 18. The mobile switching center 30 is further connected to the message center 20 used in providing short message services.

Delivery of a short message service message to a short message service entity 12 originates at the message center 20 where a query is sent to the home location register 42 associated with the addressee mobile station 18. Responsive thereto, the home location register 42 provides the message center 20 with information relating to the status of the addressee mobile station (such as active/inactive, currently serving mobile switching center 30, etc.). Provided the mobile station 18 is in the proper state to receive a short message service message, a short message service delivery point-to-point (SMSDPP) invoke communication is generated and transmitted from the message center 20 to the mobile switching center 30. At the mobile switching center 30, the associated visitor location register 44 is queried and a response is received indicating current mobile station state for receiving the message. Provided the mobile station 18 is in the proper state, the mobile switching center 30 pages the addressee mobile station via the base station 24 through which the mobile station made its last system access. If the mobile station 18 answers the page, the message is delivered to the addressee mobile station by means of a transmission made over the air interface 26, generally using the digital control channel (DCC).

Digital data message services (like short message service (SMS) message delivery, and unstructured supplementary service data (USSD) message delivery) are currently offered only to those subscribers having either a digital capable cellular telephone or a dual mode capable cellular telephone. Delivery of the SMS or USSD message invoke communication fails if the addressee mobile station 18 is, at the time of attempted delivery, operating in an analog mode. This is because the analog type of air interface, and in particular the analog control channel (ACC), typically does not support digital data message delivery. There is a need then for a system to facilitate the delivery of digital data messages to dual mode mobile stations operating at the time of message delivery utilizing the analog air interface. It is further recognized that a large number of analog only operable mobile stations exist, and would appreciate having access to digital data message services. There would be an advantage then if the solution for delivery of digital data messages to dual mode mobile stations operating over the analog air interface could also support such message deliveries to analog only capable mobile stations.

Digital data message services further are currently offered only in those service areas supported by digital or dual mode capable mobile switching centers. This is because analog mobile switching centers are not capable of digital message handling operations. There would be an advantage then if delivery of digital data messages could be accomplished through an analog mobile switching center.

SUMMARY OF THE INVENTION

To address the foregoing and other problems, the present invention proposes a number of different mechanisms for effectuating the delivery of digital data messages to mobile stations which have currently selected an analog control channel. In one method, responsive to a waiting digital data message delivery, a determination is made as to the current mode (analog or digital) of the addressee mobile station. If the mobile station is currently in analog mode and thus tuned to an analog control channel, a signal is sent by the network to the mobile station instructing it to make a server reselection and choose the best available digital control channel. Once the reselection is accomplished, the digital data message is delivered in a conventional manner using the digital control channel.

In another method, the digital data message is reformatted for analog delivery. In one aspect, this reformatted message is sent to the mobile station over the analog control channel. In another aspect, the reformatted message is sent to the mobile station over a selected analog voice channel. In either case, the received message is detected by the mobile station and displayed to the subscriber.

In yet another method, a call connection is established between the network and the mobile station over an analog voice channel. An audible message corresponding to the digital data message is then synthesized and transmitted over the voice channel after the subscriber answers the call.

In accordance with another aspect of the present invention, mobile stations are programmed to engage in a forced re-registration in instances where digital data message delivery over a control channel is interrupted due to mobile station roaming and the making of a new server selection. Responsive to the server reselection and accompanying re-registration, continued message delivery to the mobile station is triggered utilizing a new control channel.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

The present invention relates to the delivery of digital data messages to mobile stations in a dual mode (analog/digital) communications environment. For example, for a cellular communications network, the digital data messages may comprise a short message service (SMS) data message, or an unstructured supplementary service data (USSD) message. The disclosure of the present invention in the context of SMS and/or USSD message delivery within a cellular communications network however is by way of example rather than limitation as to the scope of the invention.

Figure 1:
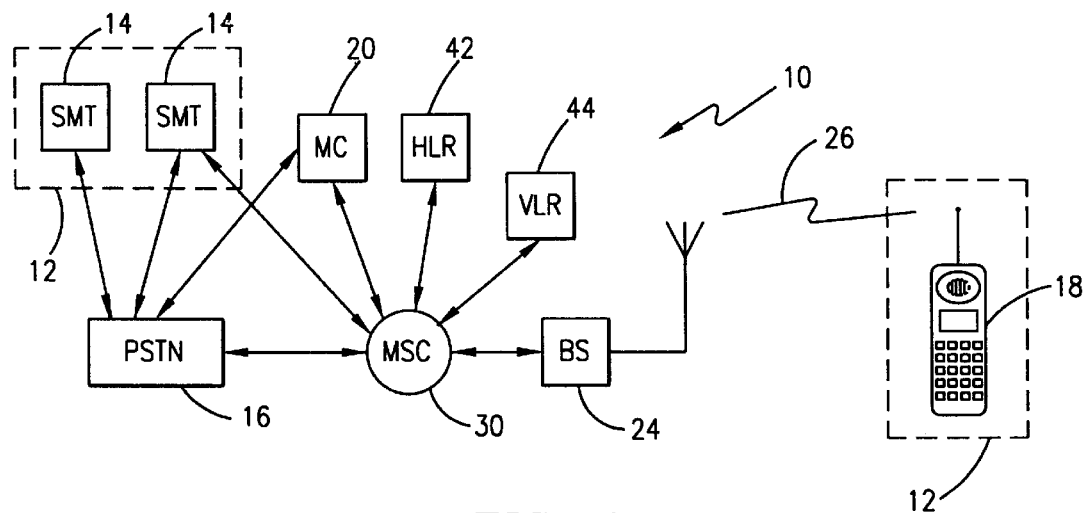
FIG. 1 (previously described) is a block diagram of a conventional cellular telephone network.
Figure 2:
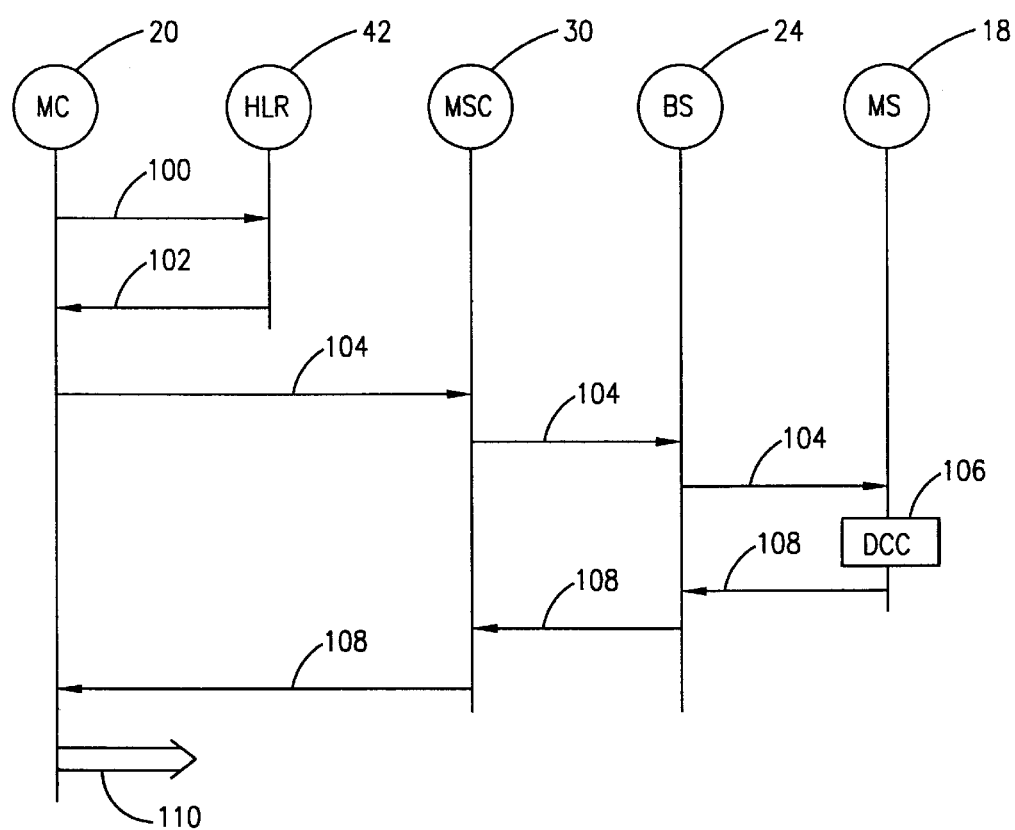
FIG. 2 is a signal flow and network operation diagram illustrating a first embodiment method for delivering a digital data message to a mobile station.

Reference is now made to FIG. 2 wherein there is shown a signal flow and network operation diagram illustrating a first embodiment method for delivering a digital data message to a mobile station 18. In this embodiment, it is assumed that the mobile station 18 comprises a dual (digital/analog) mode capable mobile station, and that the mobile station is currently utilizing the analog air interface and, in particular, the analog control channel (ACC). The message center 20 currently has a digital data message to deliver to the mobile station 18. The message center 20 then queries (signal 100) the home location register 42 for the addressee mobile station 18 to determine whether the message is deliverable. By this it is meant that the message center checks with the home location register 42 as to the current mode (analog or digital) of the mobile station 18 as well as its location. The home location register 42 then replies (signal 102) with the current mobile station 18 mode and location. If the reply 102 indicates that the addressee mobile station 18 has access to a digital control channel (DCC), delivery of the digital data message from the message center 20 occurs in accordance with the conventional procedure well known to those skilled in the art (not shown).

If the reply 102, however, indicates that the addressee mobile station 18 currently only has access to an analog control channel (ACC), delivery of the digital data message is impossible because analog control channels typically do not support digital data messaging. The message center 20 then signals 104 the serving mobile switching center 30 requesting the switching of the addressee mobile station 18 from the currently utilized analog control channel to a digital control channel (i.e., forced server reselection). This request signal 104 is then forwarded by the mobile switching center 30 to the mobile station 18 through the serving base station 24. Responsive to the request 104, and assuming that a digital control channel is available for access, the mobile station accesses (locks on to or reselects) the digital control channel (action 106). This access is made even if the selected digital control channel is not the best server selection choice (from a signal strength point of view). The access made by the mobile station 18 is then reported 108 back to the message center 20. At that point, the message center initiates (action 110) a conventional digital data delivery procedure utilizing the accessed digital control channel (not shown).

Figure 3:
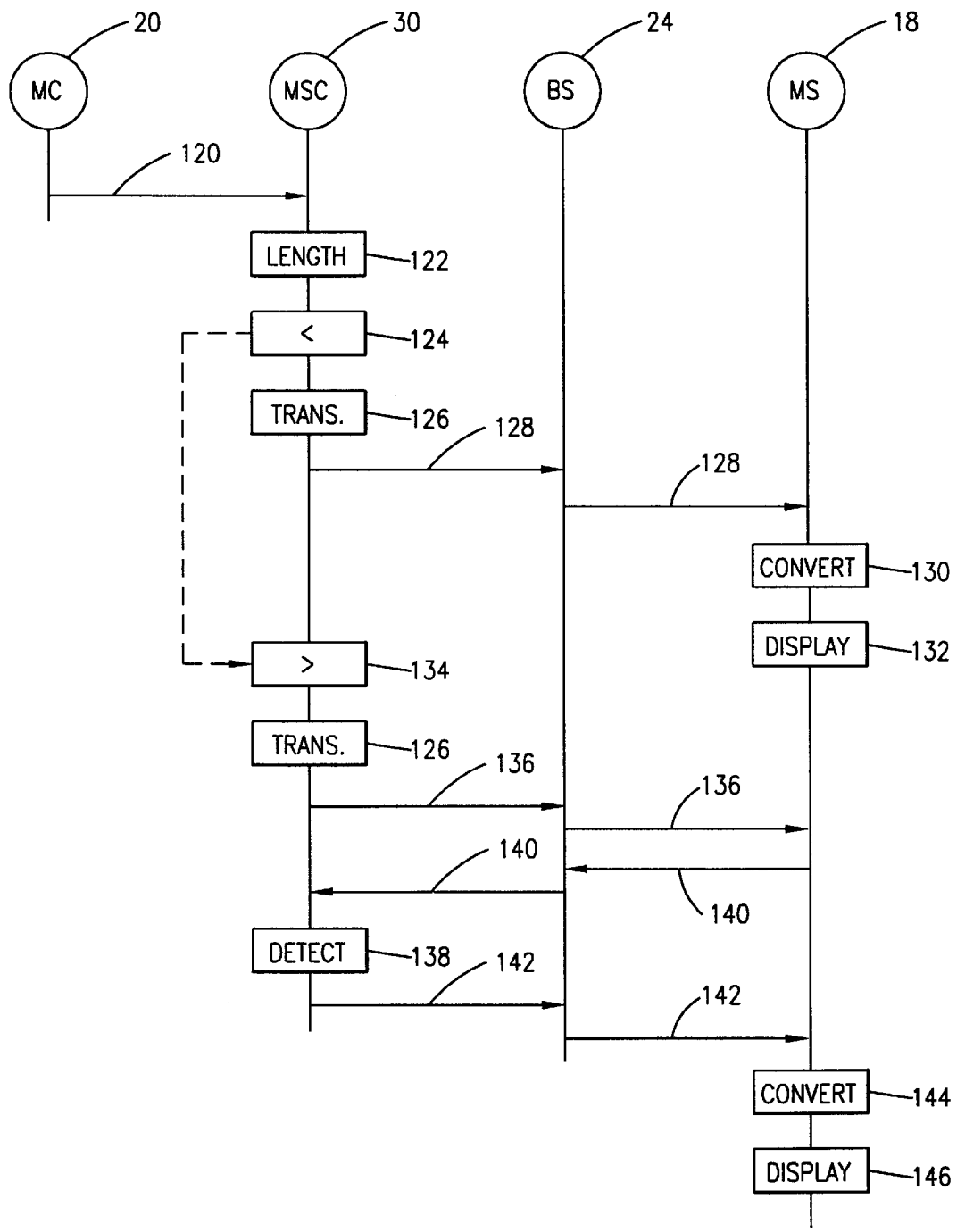
FIG. 3 is a signal flow and network operation diagram illustrating a second embodiment method for delivering a digital data message to a mobile station.

Reference is now made to FIG. 3 wherein there is shown a signal flow and network operation diagram illustrating a second embodiment method for delivering a digital data message to a mobile station 18. In this embodiment, it is assumed that the mobile station 18 comprises a dual (digital/analog) mode capable mobile station, and that the mobile station is currently utilizing the analog air interface and, in particular, the analog control channel (ACC). It is further assumed that the mobile station 18 cannot access a digital control channel (as in FIG. 2) to facilitate the digital data delivery. Alternatively, it is assumed that the mobile station 18 comprises an analog only capable mobile station, and that the mobile station is currently utilizing the analog air interface and, in particular, the analog control channel (ACC).

The message center 20 initiates a modified digital data delivery point to point invoke communication 120 destined for the addressee mobile station 18, and further identifying that the mobile station is operating on an analog control channel. The invoke 120 is routed to the serving mobile switching center 30 where a check (action 122) is made as to the length of the digital data message to be delivered. If the message length is less than a pre-determined threshold length (action 124), delivery is to be attempted using the analog control channel as the transmission medium. The digital data message within the invoke 120 is then translated (action 126) for analog control channel delivery. By "translated" it is meant that the text of the data message (bearer data) is encoded onto a forward analog control channel message. This encoding may comprise use of the known International Alphabet No. 5 (IA5) format. The translated message is then delivered (signal 128) to the addressee mobile station 18 (as a data signal) via the serving base station 24. The delivered message is then converted (action 130) by the mobile station 18 for display (action 132) to the subscriber. By "converted" it is meant that the delivered message is altered to a format for mobile station handling and manipulation in the same manner as if the message were received in a conventional manner over the digital control channel or digital traffic channel.

If the message length is greater than the predetermined threshold length (action 134), delivery over the analog control channel is not preferred because it could consume channel bandwidth needed for use in conveying control signaling between the mobile station 18 and the network 10. Instead, delivery is to be attempted using a selected analog voice channel as the transmission medium. The digital data message within the invoke 120 is then translated (action 126) for analog delivery. "Translated" in this context refers to the conversion of the data message (bearer data) for in-band signaling over the analog voice channel. This conversion may comprise the generation of analog signal (such as dual tone multi-frequency (DTMF) signals) representative of International Alphabet No. 5 (IA5) formatted data. For example, text character "A" may be represented by the DTMF signal frequency generated by key "2" and key "1". A signal 136 is then sent to the mobile station 18 ordering it to access a selected analog voice channel. Following mobile switching center 30 detection (action 138) of a mobile station access 140 on the selected voice channel, the mobile switching center delivers (signal 142) the translated message (preferably utilizing dual tone multi-frequency (DTMF) tones) to the addressee mobile station 18 via the serving base station 24. The delivered message is then converted (action 144) by the mobile station 18 for display (action 146) to the subscriber. "Converted" in this context refers both to the generation of an IA5 formatted message from the received analog DTMF tones, as well as the alteration of the generated IA5 message to a format for mobile station handling and manipulation in the same manner as if the message were received in a conventional manner over the digital control channel or digital traffic channel. It should be noted that this voice channel message delivery occurs in a manner transparent to the subscriber. By this it is meant that the subscriber is not alerted as to the call set-up being made on the analog voice channel for purposes of making the message delivery.

Figure 4:
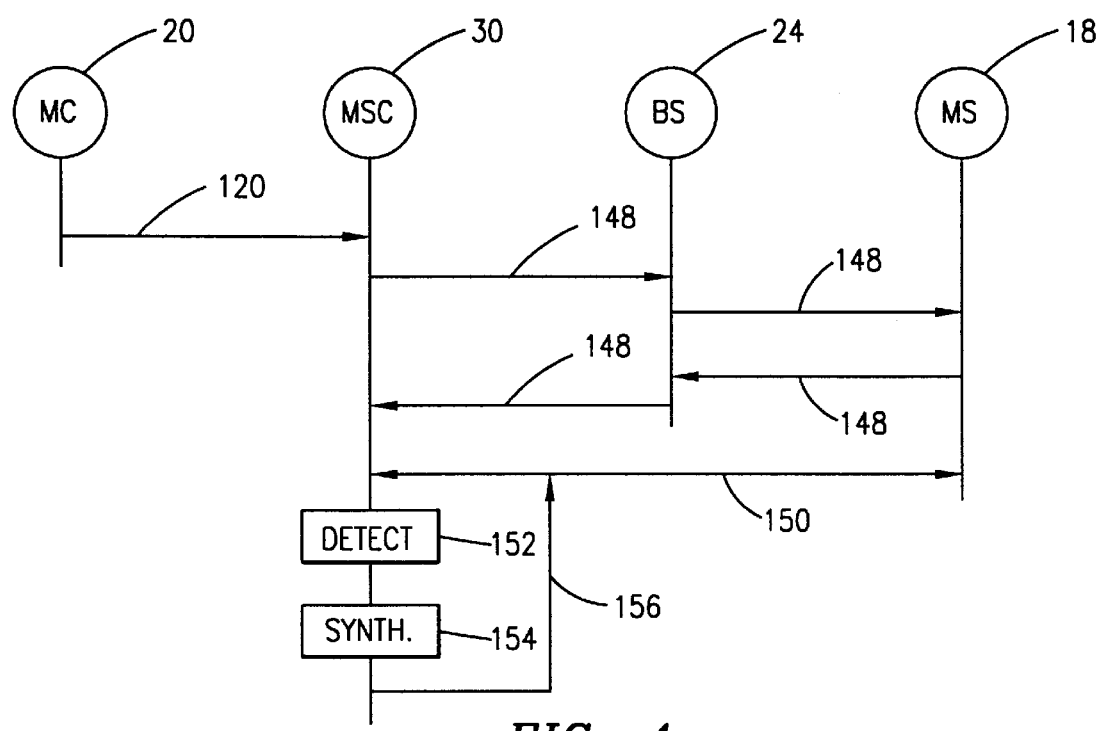
FIG. 4 is a signal flow and network operation diagram illustrating a third embodiment method for delivering a digital data message to a mobile station.

Reference is now made to FIG. 4 wherein there is shown a signal flow and network operation diagram illustrating a third embodiment method for delivering a digital data message to a mobile station 18. In this embodiment, it is assumed that the mobile station 18 comprises a dual (digital/analog) mode capable mobile station, and that the mobile station is currently utilizing the analog air interface and, in particular, the analog control channel (ACC). It is further assumed that the mobile station 18 cannot access a digital control channel (as in FIG. 2) to facilitate the digital data delivery. Alternatively, it is assumed that the mobile station 18 comprises an analog only capable mobile station, and that the mobile station is currently utilizing the analog air interface and, in particular, the analog control channel (ACC).

The message center 20 initiates a modified digital data delivery point to point invoke communication 120 destined for the addressee mobile station 18, and further identifying that the mobile station is operating on an analog control channel. The invoke 120 is then routed to the serving mobile switching center 30. A call set-up 148 is then performed by the serving mobile switching center 30 with respect to the addressee mobile station 18 to establish a call connection 150 over an analog voice channel. Following mobile switching center 30 detection (action 152) of the subscriber answering the call 148, the mobile switching center synthesizes (action 154) an audible message corresponding to the digital data message, and then delivers (signal 156) the synthesized message to the addressee mobile station 18 over the call connection 150.

The concept of "hand-off" or "handover" is well known to those skilled in the art with respect to the network handling of on-going subscriber voice channel communications in instances of mobile station roaming. Briefly summarized, in order to support the large number of requesting subscribers in view of the limited available communications spectrum, a cellular service area is divided into a plurality of cells, with the cells having assigned thereto certain communications frequencies for mobile station use as voice and control channels. One of the principle advantages provided by cellular telephone service is that of mobility. As a subscriber roams throughout the service area while engaged in a cellular call, the network recognizes degradation of the communication carried by the current voice channel, and selects a new voice channel to continue supporting that communication. The switching of cellular communications from one voice channel to another voice channel during an on-going voice call comprises a "hand-off" or "handover".

With respect to FIG. 3 described above, a mechanism is presented for facilitating the delivery of digital data messages over the analog control channel. The limited bandwidth capabilities of the analog control channel, as well as the pressures exerted to carry other types of communications, however, restrict its use in the preferred embodiment with respect to the delivery of digital data messages to delivering only those messages having a length that is less than a pre-determined threshold length (see, action 124). Even with such a length restriction, and given the bandwidth limitations of the analog control channel, instances may occur where the length of time spent delivering the message over the analog control channel exceeds the amount of time a roaming mobile station has left available for communications within a certain currently serving cell before engaging in server reselection. Accordingly, the concept of a control channel, as opposed a voice channel, hand-off or handover is introduced herein to facilitate continued control channel message delivery. This concept, although especially tailored to meet the limitations of analog control channel message delivery, is equally applicable, when necessary, to digital control channel message delivery. The description provided herein as to analog control channel operation is accordingly presented merely to illustrate, rather than limit the scope of, the present invention.

Figure 5:
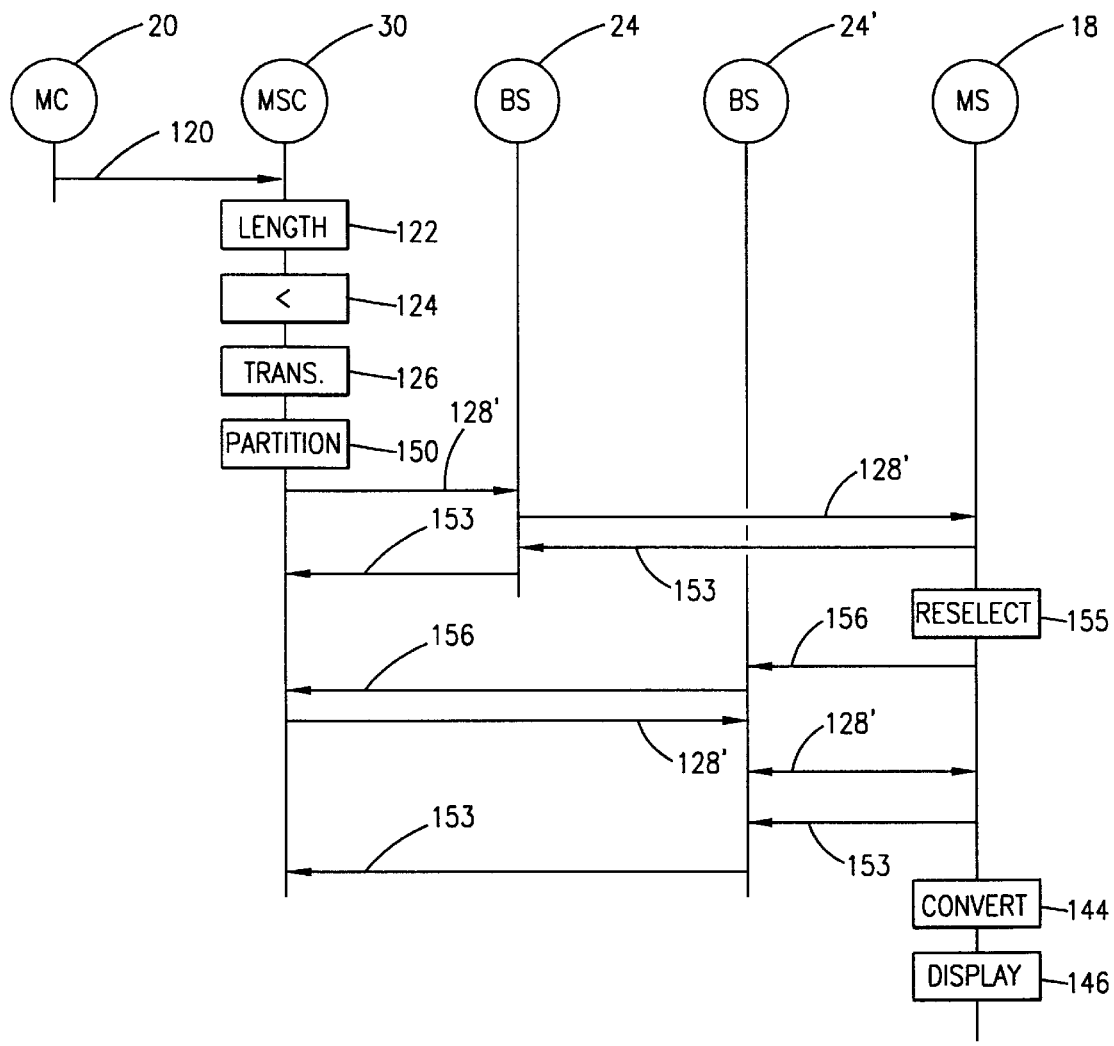
FIG. 5 is a signal flow and network operation diagram illustrating a process for control channel handoff.

Reference is now made to FIG. 5 wherein there is shown a signal flow and network operation diagram illustrating a process for control channel hand-off. The message center 20 initiates a modified digital data delivery point to point invoke communication 120 destined for the addressee mobile station 18, and further identifies that the mobile station is operating on an analog control channel. The invoke 120 is routed to the serving mobile switching center 30 where a check (action 122) is made as to the length of the digital data message to be delivered. If the message length is less than a pre-determined threshold length (action 124), delivery is to be attempted using the analog control channel as the transmission medium. The digital data message within the invoke 120 is then translated (action 126) for analog control channel delivery and partitioned (action 150) into a plurality of message components. By "translated" it is meant that the text of the data message (bearer data) is encoded onto a forward analog control channel message. This encoding may comprise the known International Alphabet No. 5 (IA5) format. By "partitioned" it is meant that the data message is segmented into a plurality of packets (of perhaps five to ten octets in length each). The individual components (packets) of the translated and partitioned message are then sequentially delivered (signals 128') to the addressee mobile station 18 (as data signals) via the serving base station 24.

Following receipt of each individual component, the mobile station transmits an acknowledgment (signal 153) back to the mobile switching center 30. The components of the delivered message are buffered, and when transmission is completed, the message is converted (action 144) by the mobile station 18 for display (action 146) to the subscriber. By "converted" it is meant that the delivered message altered to a format for mobile station handling and manipulation in the same manner as if the message were received in a conventional manner over the digital control channel or digital traffic channel.

Assume now that the addressee mobile station is currently moving, and that during the course of the sequential delivery of the message components (see, signals 128' and 153) the mobile station engages in server reselection (action 155) thus choosing and locking onto a new control channel. In accordance with the prior art operation known to those skilled in the art, the mobile station does not inform the supporting communications network as to the server reselection. In accordance with the present invention, however, responsive to the reselection 155, the mobile station 18 makes a forced registration (signal 156) with the mobile switching center 30 in connection with the newly serving cell. The mobile switching center 30 receives the registration signal 156, recognizes both the mobile station and the fact that the prior message delivery, which was interrupted by the reselection 155, remains uncompleted. Sequential delivery of the message components (see, signals 128' and 155) via a new serving base station 24' (and the new control channel) then continues starting with the first individual component in the sequence which has not yet been acknowledged as delivered. This procedure allows the mobile switching center to immediately complete message delivery following mobile station server reselection.

Although embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for delivering a subscriber digital data message to a mobile station which has currently selected an analog control channel, comprising the steps of:
   receiving a subscriber digital data message addressed to the mobile station which has currently selected the analog control channel;
   sending, in response to receipt of the subscriber digital data message, a command signal to the mobile station ordering the mobile station to engage in a server reselection of a digital control channel; and
   delivering the subscriber digital data message to the mobile station following mobile station accessing of the digital control channel, the step of delivering comprising the step of utilizing the accessed digital control channel to carry the subscriber digital data message.

2. The method as in claim 1 further including the steps of:
   determining the current operating mode of the mobile station;
   performing the step of sending if the current operating mode of the mobile station indicates selection of the analog control channel.

3. The method as in claim 2 wherein the step of determining comprises the step of querying a home location register for the mobile station with a request for mobile station operating mode.

4. The method as in claim 1 wherein the server reselection occurs even if the selected digital control channel is not the best possible server selection.

5. A method for delivering a subscriber digital data message to a mobile station which has currently selected an analog control channel, comprising the steps of:
   comparing a length of the subscriber digital data message to a threshold; if the length is less than the threshold:
   translating the subscriber digital data message for transmission over the analog control channel; and
   delivering the subscriber digital data message to the mobile station as a data communication over the analog control channel; and if the length is greater than the threshold:
   translating the subscriber digital data message for transmission over an analog voice channel;
   seizing the analog voice channel; and
   delivering the subscriber digital data message as a data communication over the analog voice channel.

6. The method as in claim 5 wherein the step of seizing is performed without alerting a subscriber assigned to the mobile station.

7. The method as in claim 5 wherein the step of delivering is performed in a manner transparent to a subscriber assigned to the mobile station.

8. The method as in claim 5 further including the steps of:
   converting the data communication transmitted over the analog voice channel back to the subscriber digital data message; and
   displaying the subscriber digital data message.

9. The method as in claim 5 further including the steps of:
   converting the data communication transmitted over the analog control channel back to the subscriber digital data message; and
   displaying the subscriber digital data message.

10. The method of claim 5 wherein the subscriber digital data message is translated from a digital control channel format into an analog control channel format for transmission over the analog control channel.

11. The method of claim 5 wherein the subscriber digital data message is translated from a digital control channel format into an analog voice channel format for transmission over the analog voice channel.

12. The method of claim 5, wherein the message center node comprises a short message terminal (SMT).

13. The method of claim 5, wherein the message center node comprises a store and forward terminal.

14. A method for delivering a subscriber digital data message to a mobile station which has currently selected an analog control channel, comprising the steps of:
   receiving a subscriber digital data message addressed to the mobile station which has currently selected the analog control channel;
   performing, in response to receipt of the subscriber digital data message, a call set-up to the mobile station to establish a call connection with the mobile station;
   synthesizing an audible communication corresponding to the digital data message; and
   transmitting the audible communication to the mobile station over the call connection.

15. The method as in claim 14 further including the step of performing the step of transmitting only after a subscriber assigned to the mobile station answers the call connection.

16. A method for delivering a subscriber digital data message to a mobile station which has currently selected an analog control channel, comprising the steps of:

receiving a subscriber digital data message addressed to the mobile station which has currently selected the analog control channel;

translating, in response to receipt of the subscriber digital data message, the subscriber digital data message for transmission over the analog control channel;

partitioning the translated message into a plurality of message components; and sequentially delivering the plurality of message components of the digital data message to the mobile station as a corresponding plurality of data communications over the analog control channel;

monitoring during the course of the sequential delivery for a re-registration by the mobile station indicative of the selection of a new analog control channel; and continuing the step of sequentially delivering by sequentially delivering any remaining plurality of message components of the subscriber digital data message to the mobile station as a corresponding remaining plurality of data communications over the new analog control channel.

17. The method as in claim 16 further including the steps of:

converting the plurality of data communications transmitted over the analog control channel back to the subscriber digital data message; and displaying the subscriber digital data message.

18. A method for mobile station operation in connection with the delivery of a digital data message, wherein the digital data message is configured for transmission over a control channel and partitioned into a plurality of message components, comprising the steps of:

sequentially receiving the plurality of message components of the digital data message as a corresponding plurality of data communications over the control channel;

making during the course of the sequential delivery a server selection of a new control channel;

performing a re-registration in response to the made server selection;

continuing to sequentially receive any remaining plurality of message components of the digital data message as a corresponding plurality of data communications over the new control channel;

acknowledging each received message component;

converting the plurality of data communications transmitted over the control channel back to the digital data message; and displaying the digital data message.

19. The method as in claim 18 wherein the control channel comprises either an analog control channel or a digital control channel.

* * * * *